(12) United States Patent
Lee et al.

(10) Patent No.: US 12,467,770 B2
(45) Date of Patent: Nov. 11, 2025

(54) SENSING DEVICE

(71) Applicant: LG INNOTEK CO., LTD., Seoul (KR)

(72) Inventors: Chang Hwan Lee, Seoul (KR); Ye Won Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 483 days.

(21) Appl. No.: 17/637,115

(22) PCT Filed: Aug. 26, 2020

(86) PCT No.: PCT/KR2020/011384
§ 371 (c)(1),
(2) Date: Feb. 22, 2022

(87) PCT Pub. No.: WO2021/040401
PCT Pub. Date: Mar. 4, 2021

(65) Prior Publication Data
US 2022/0297753 A1    Sep. 22, 2022

(30) Foreign Application Priority Data

Aug. 30, 2019  (KR) .................. 10-2019-0107280
Dec. 4, 2019   (KR) .................. 10-2019-0160090

(51) Int. Cl.
*G01D 5/244*     (2006.01)
*B62D 6/10*      (2006.01)
(Continued)

(52) U.S. Cl.
CPC ........... *G01D 5/24438* (2013.01); *B62D 6/10* (2013.01); *G01D 5/145* (2013.01);
(Continued)

(58) Field of Classification Search
CPC . G01L 3/104; G01L 3/101; G01L 3/10; G01L 3/04; G01L 3/02; G01L 3/00;
(Continued)

(56) References Cited

U.S. PATENT DOCUMENTS 7,784,365 B2    8/2010  Masson et al.
7,954,389 B2 *  6/2011  Maehara .................. G01L 3/104
                                                     73/862.331
(Continued)

FOREIGN PATENT DOCUMENTS

DE   10-2012-011876   12/2013
EP       2107354      10/2009
(Continued)

OTHER PUBLICATIONS

International Search Report dated Nov. 26, 2020 issued in Application No. PCT/KR2020/011384.
(Continued)

*Primary Examiner* — Judy Nguyen
*Assistant Examiner* — James Split
(74) *Attorney, Agent, or Firm* — KED & ASSOCIATES

(57) ABSTRACT

The present invention provides a sensing device comprising: a rotor; and a stator in which the rotor is disposed, wherein the stator comprises a stator tooth and a stator body, the stator tooth comprises a first stator tooth and a second stator tooth disposed inside the first stator tooth, at least one of the first stator tooth and the second stator tooth includes a tip protruding toward the center axis of the stator, and the tip is disposed at one surface of the stator body.

15 Claims, 20 Drawing Sheets

(51) Int. Cl.
　　　*G01D 5/14*　　　(2006.01)
　　　*G01L 3/10*　　　(2006.01)
　　　*G01L 5/22*　　　(2006.01)
(52) U.S. Cl.
　　　CPC .......... *G01D 5/24442* (2013.01); *G01L 3/104* (2013.01); *G01L 5/221* (2013.01); *G01D 2205/40* (2021.05)
(58) Field of Classification Search
　　　CPC .. G01L 5/221; G01L 5/22; G01B 7/30; G01P 3/42; G01D 5/145; G01D 5/142; G01D 5/14; G01D 5/12; G01D 5/00; G01D 5/24442; G01D 5/24438; G01D 5/24433; G01D 5/24428; G01D 5/244; G01D 2205/40
　　　See application file for complete search history.

(56) References Cited

U.S. PATENT DOCUMENTS

2008/0314164 A1　　12/2008　Masson et al.
2020/0059138 A1*　2/2020　Kim .................. H02K 1/14

FOREIGN PATENT DOCUMENTS

| FR | 2896035 B1 * | 1/2009 | ............. G01L 3/104 |
|---|---|---|---|
| JP | 2010-122104 | 6/2010 | |
| KR | 10-0976701 | 8/2010 | |
| KR | 10-2012-0062134 | 6/2012 | |
| KR | 10-2015-0017733 | 2/2015 | |
| KR | 10-1675662 | 11/2016 | |
| KR | 10-1992277 | 6/2019 | |
| WO | WO 2016/032785 | 3/2016 | |
| WO | WO-2018199606 A1 * | 11/2018 | ............... B62D 5/04 |

OTHER PUBLICATIONS

Chinese Office Action dated Mar. 13, 2023 issued in Application No. 202080061239.3.
European Search Report dated Jun. 20, 2023 issued in Application No. 20856574.7.

* cited by examiner

[FIG. 1]
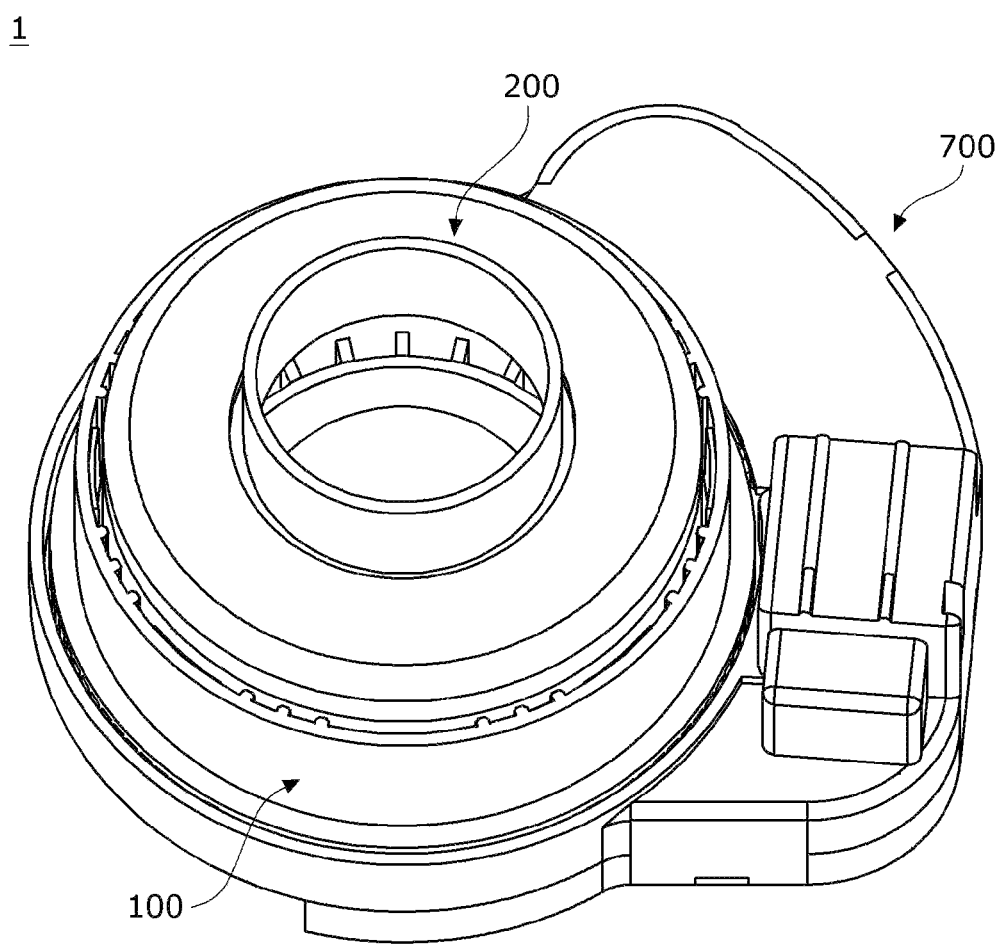

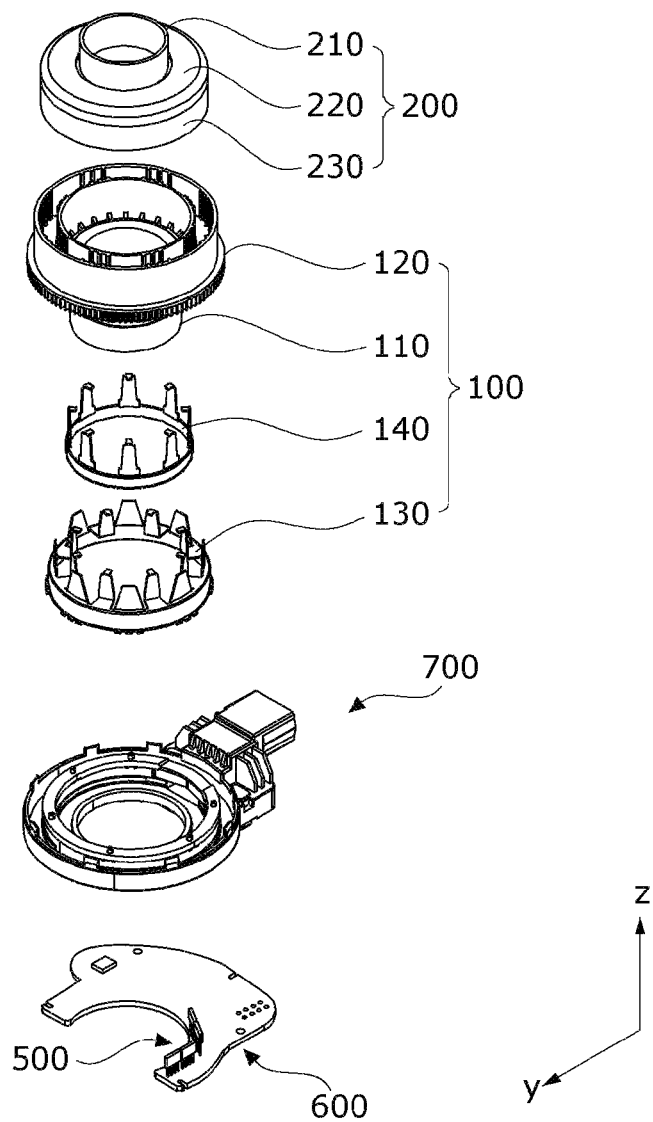
[FIG. 2]

[FIG. 3]
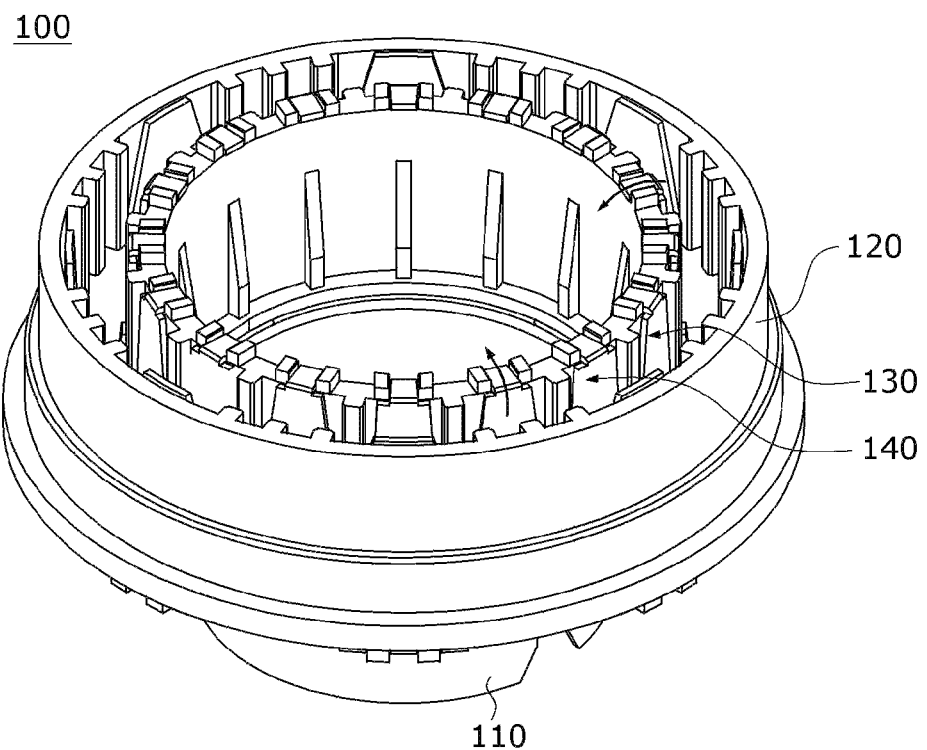

[FIG. 4]
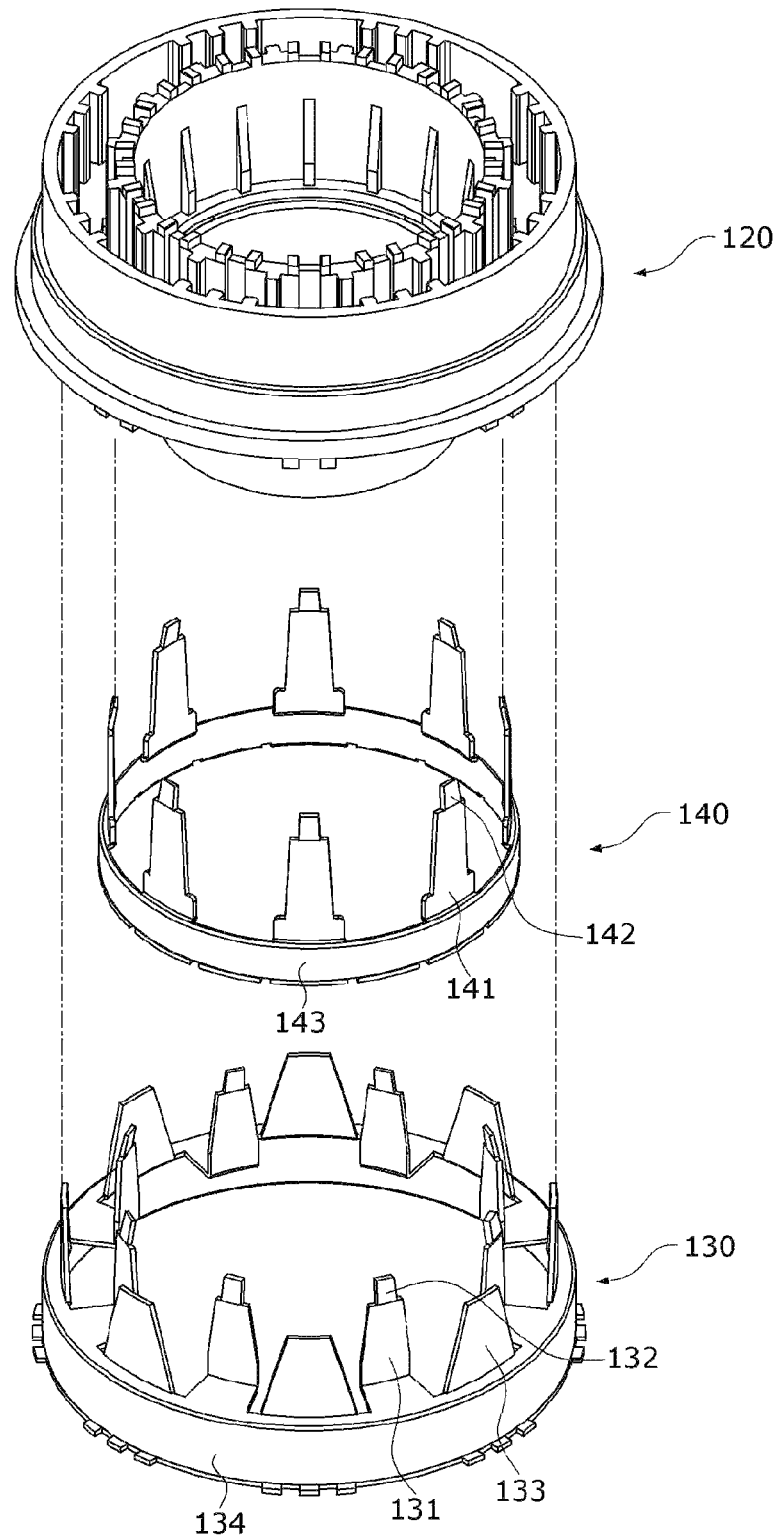

[FIG. 5]
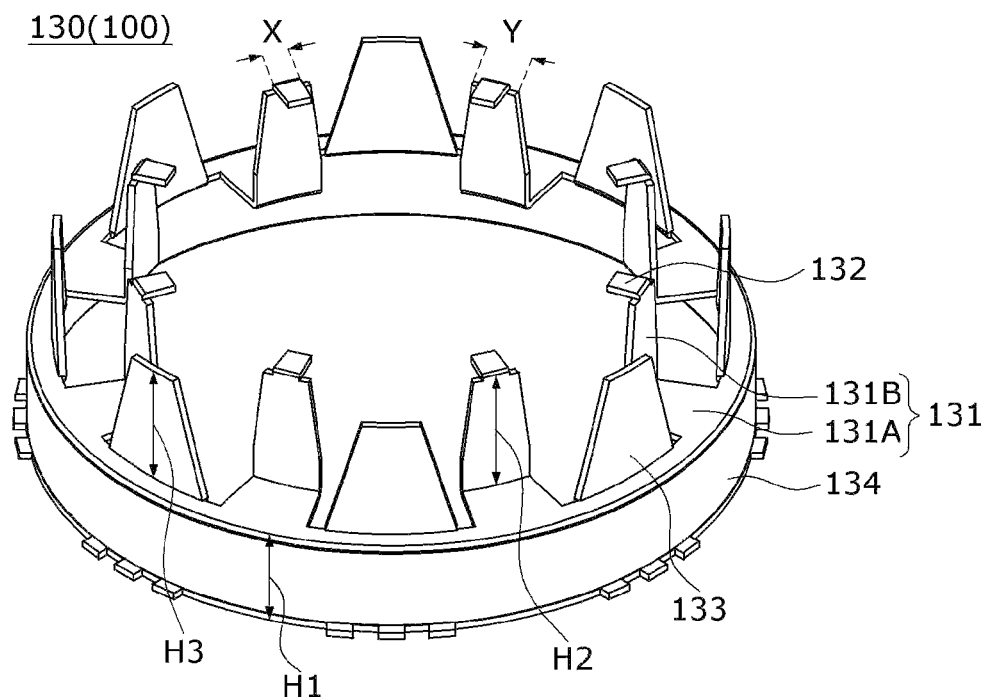
[FIG. 6]
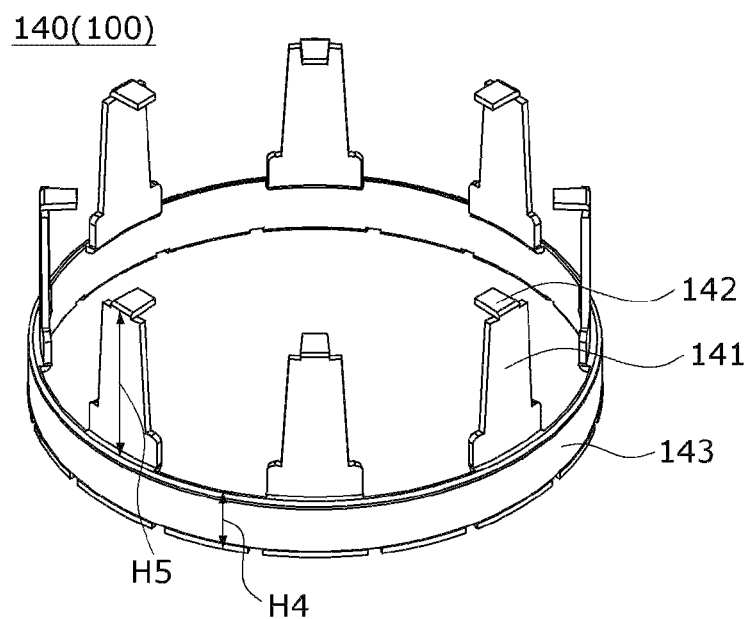

[FIG. 7]
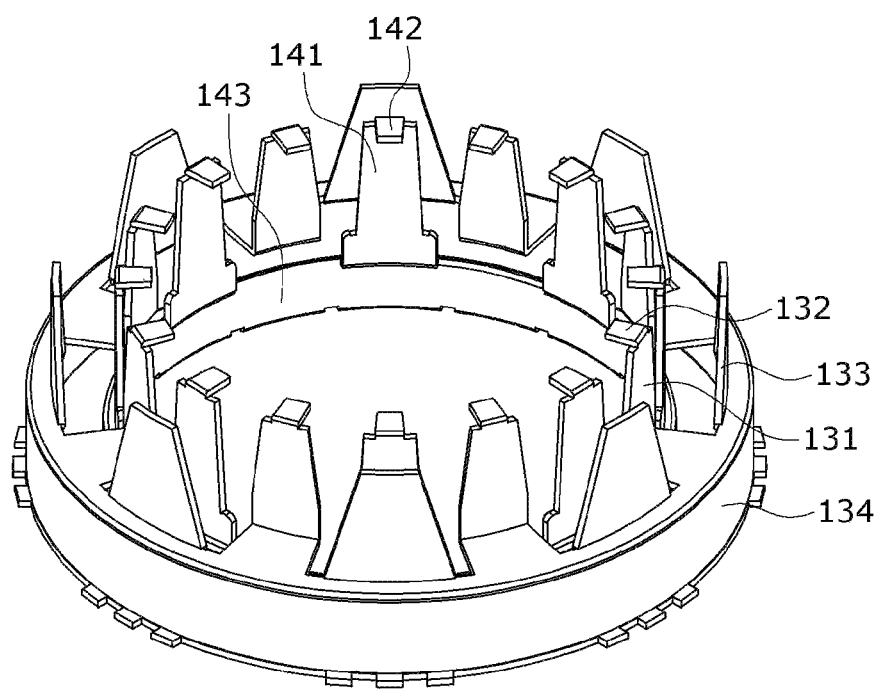

[FIG. 8]
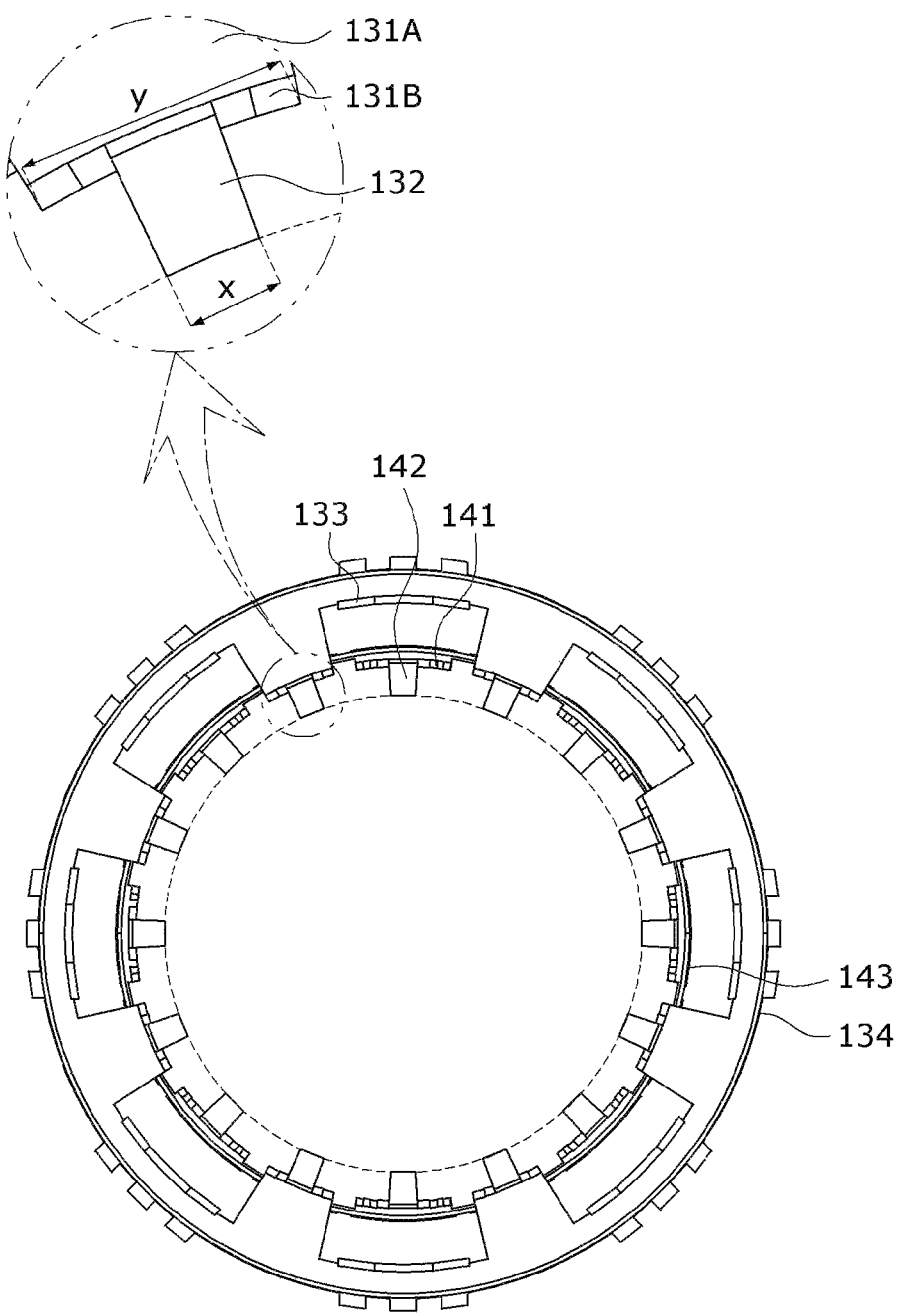

[FIG. 9]
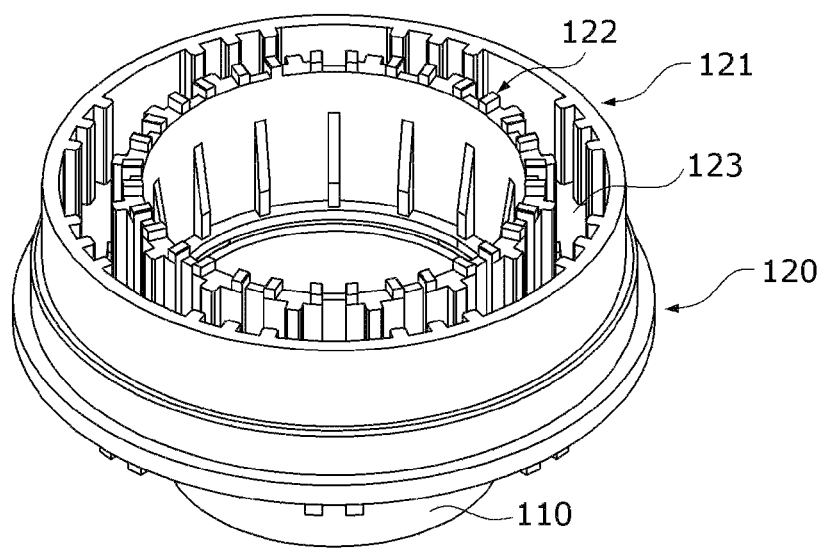

[FIG. 10]
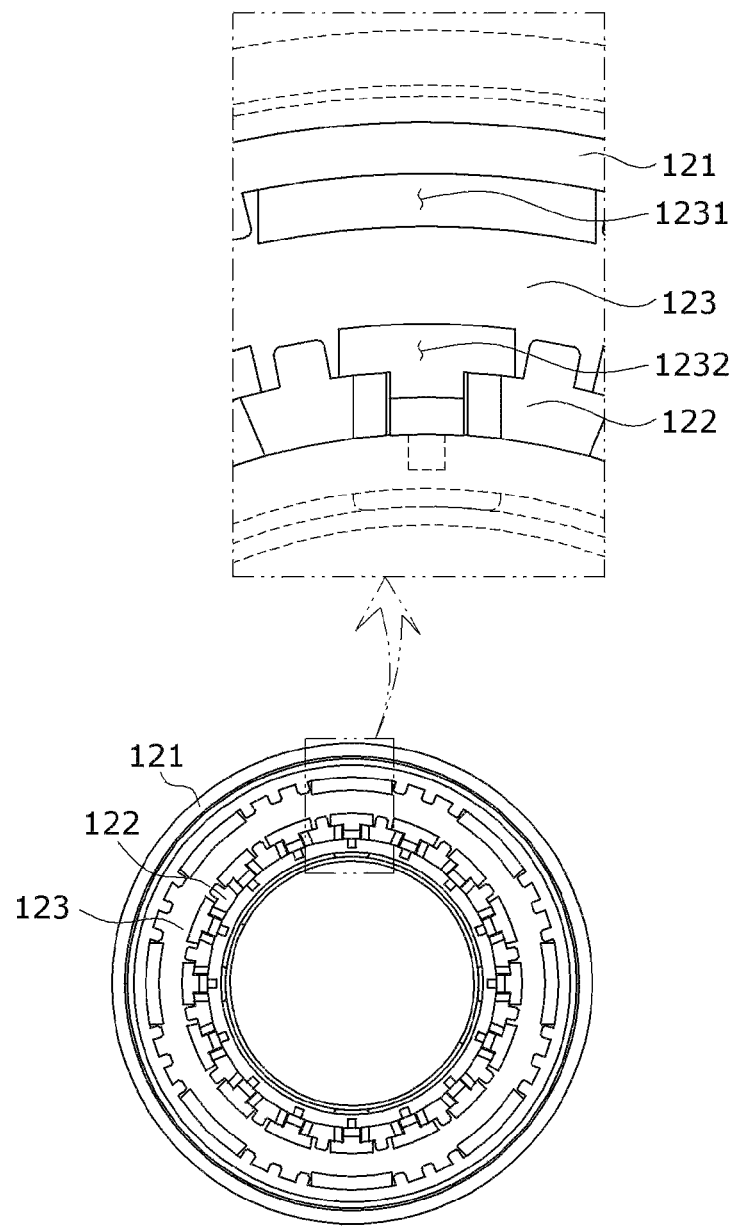

[FIG. 11]
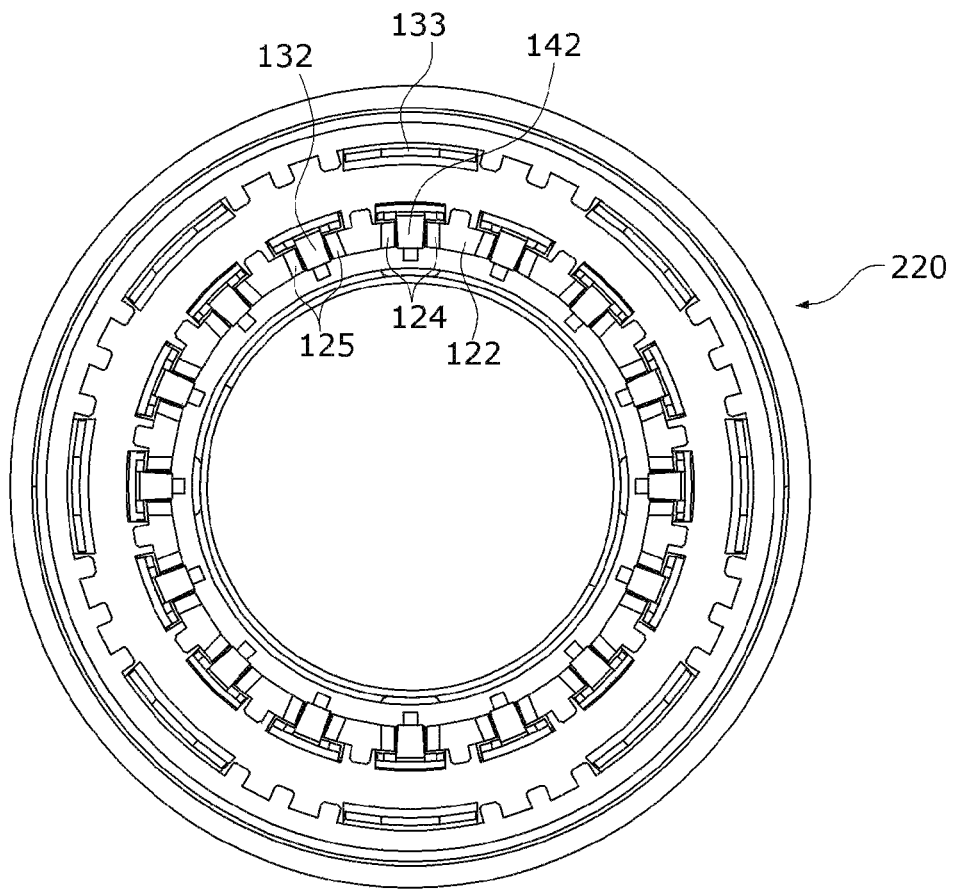
[FIG. 12]
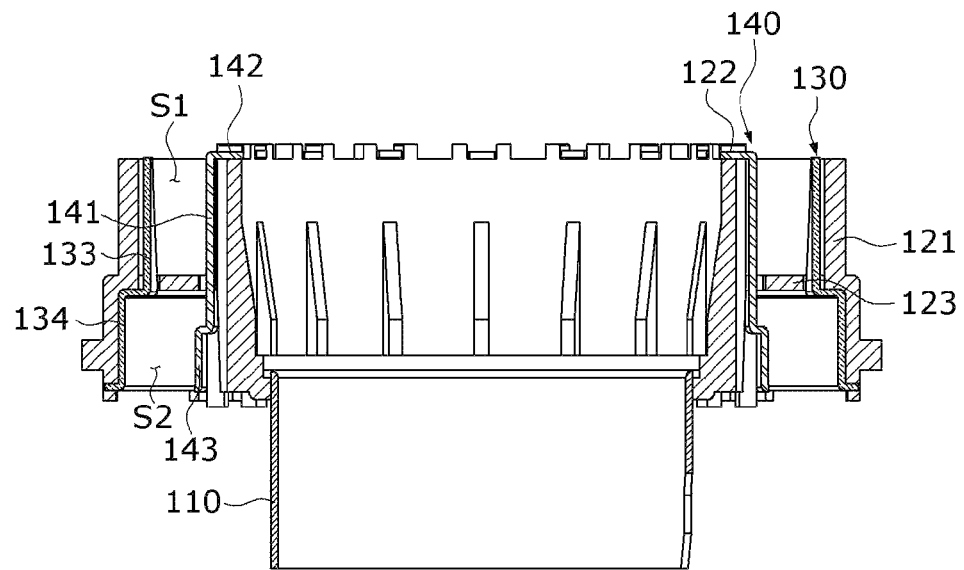

[FIG. 13]
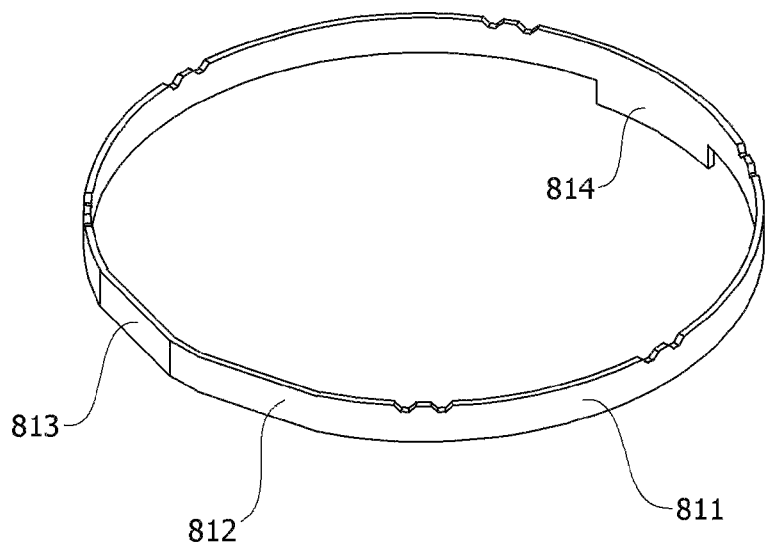
[FIG. 14]
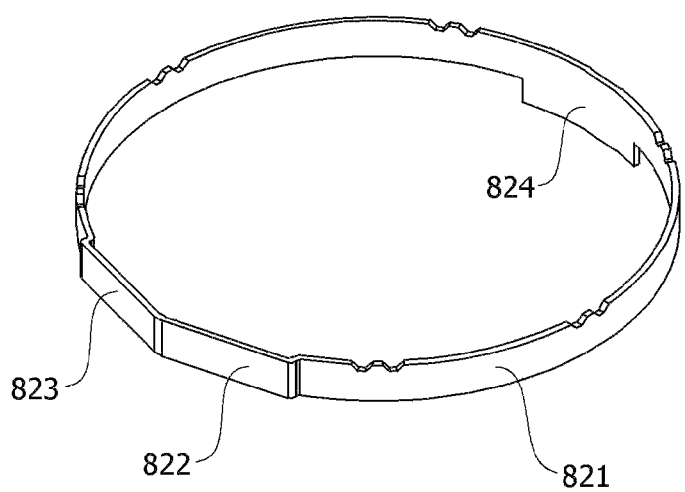

[FIG. 15]
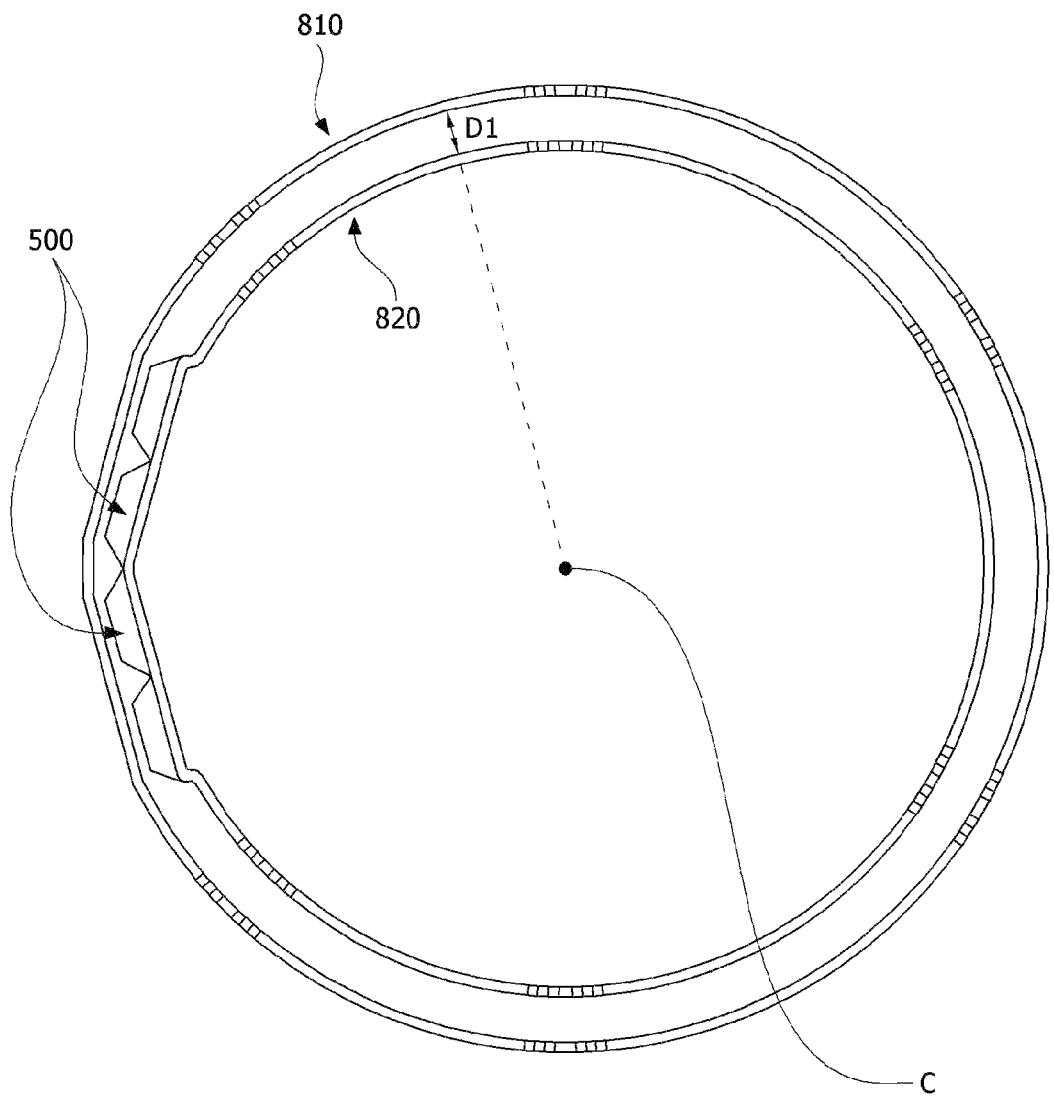

[FIG. 16]
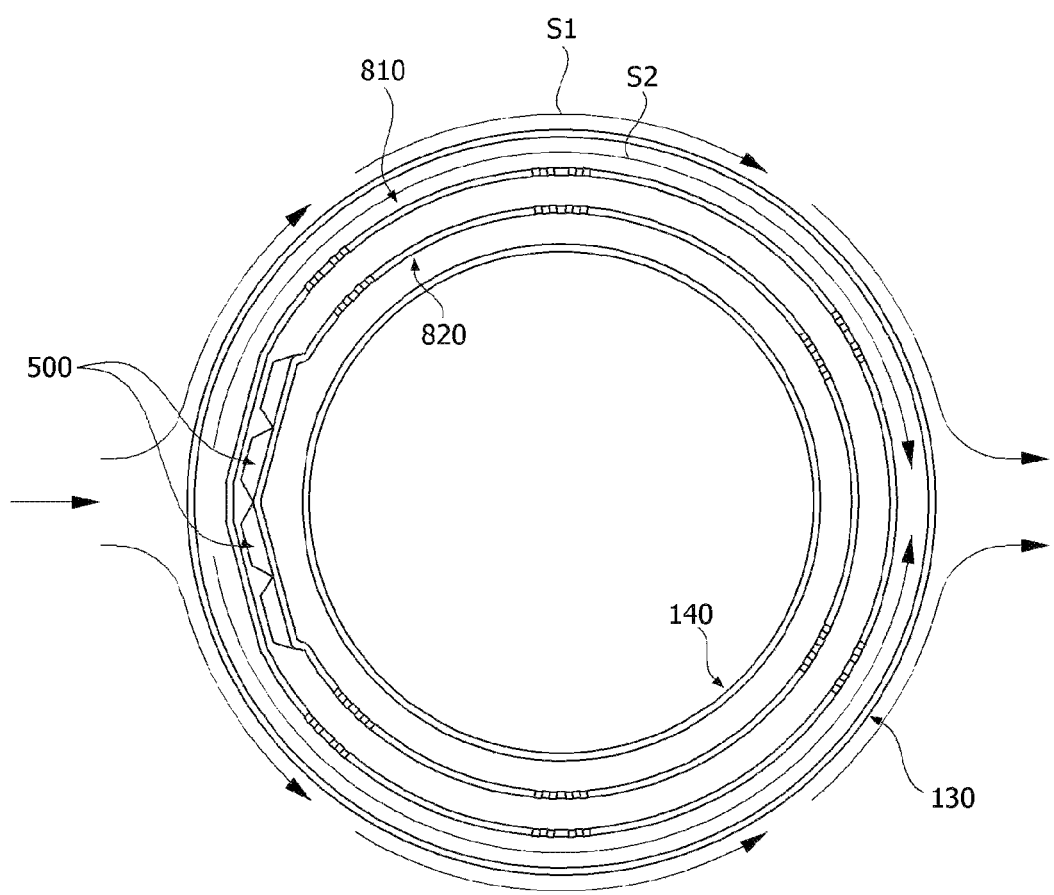

[FIG. 17]
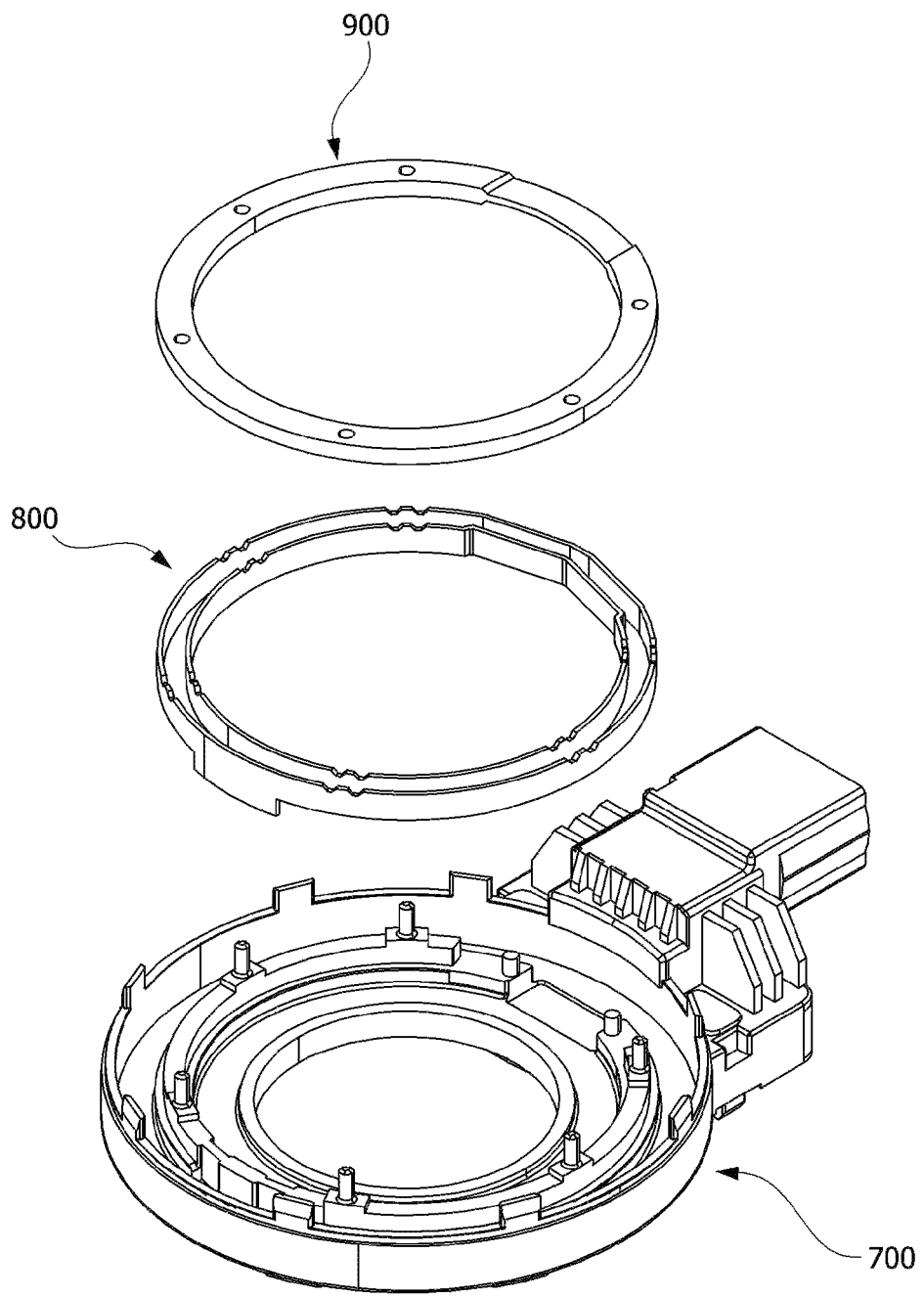

[FIG. 18]
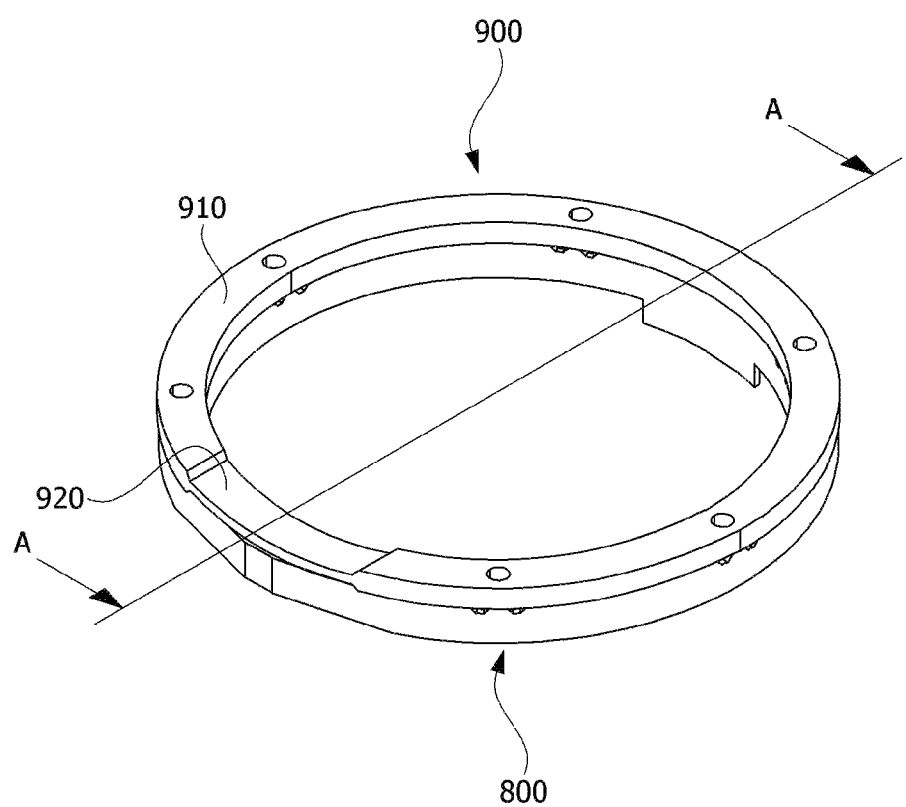

[FIG. 19]
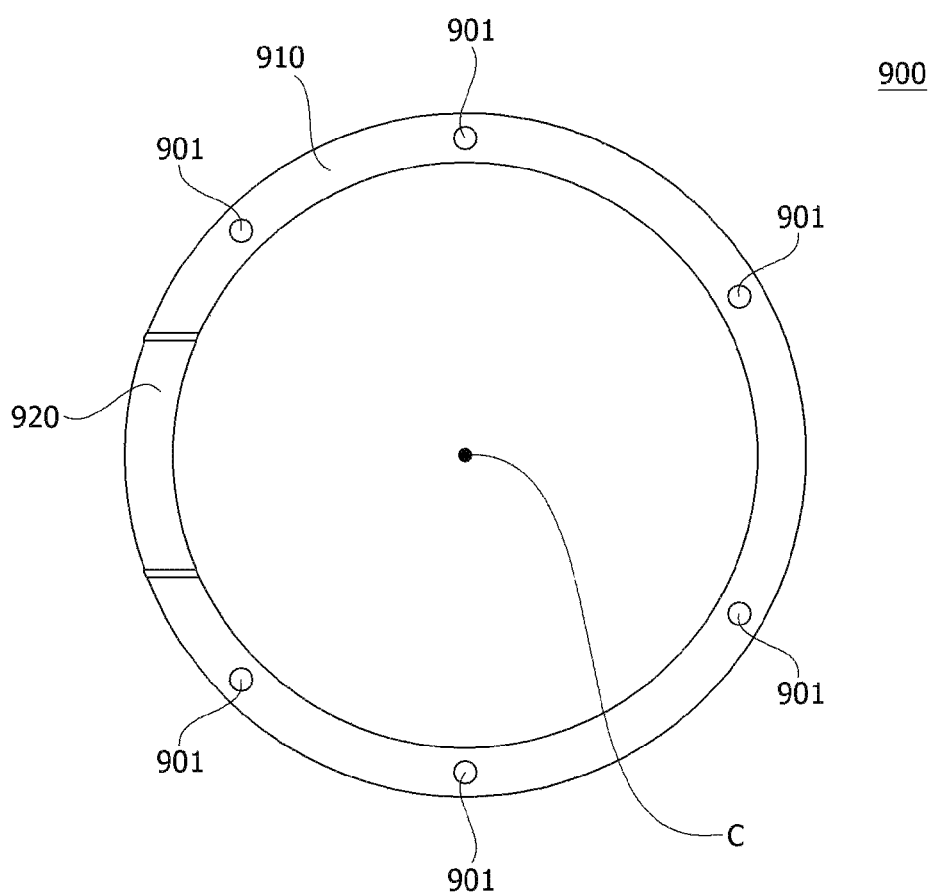

[FIG. 20]
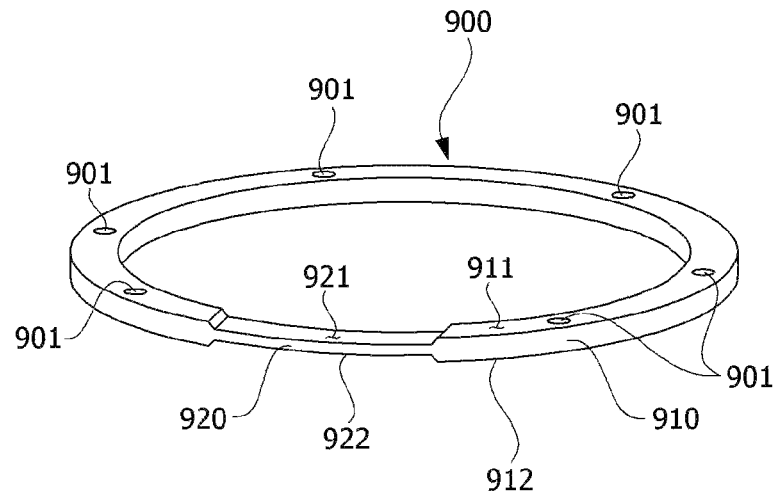
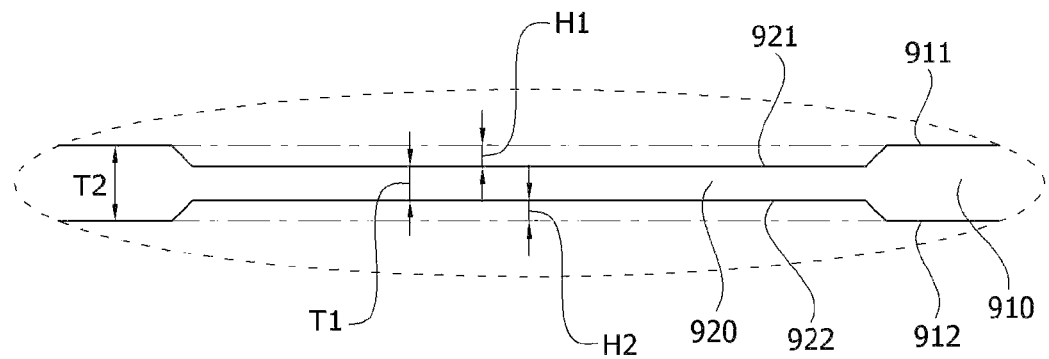
[FIG. 21]
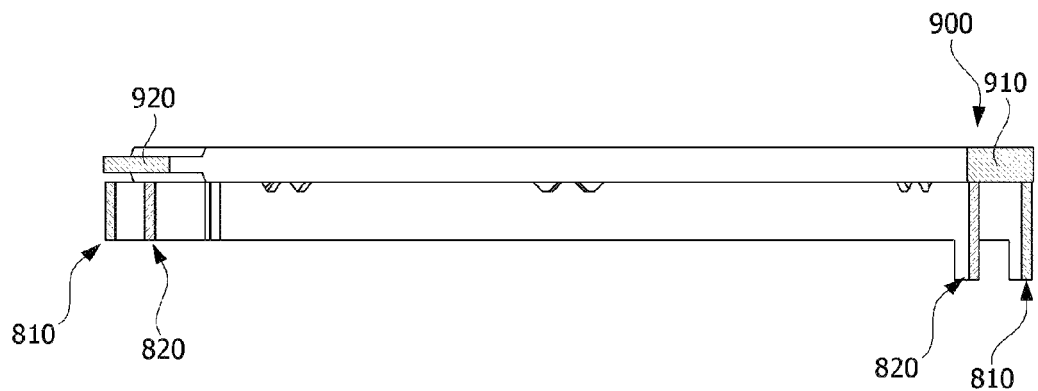

[FIG. 22]
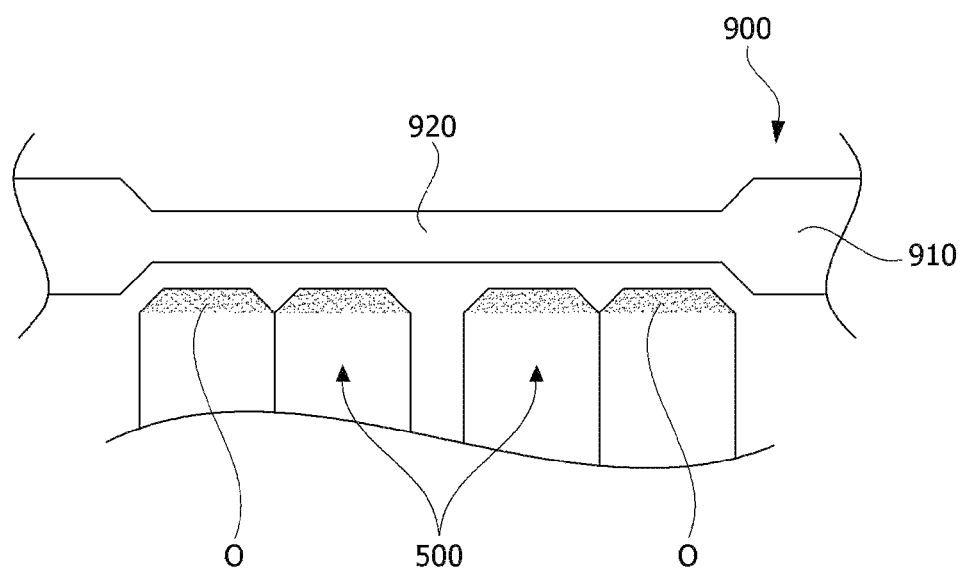

[FIG. 23
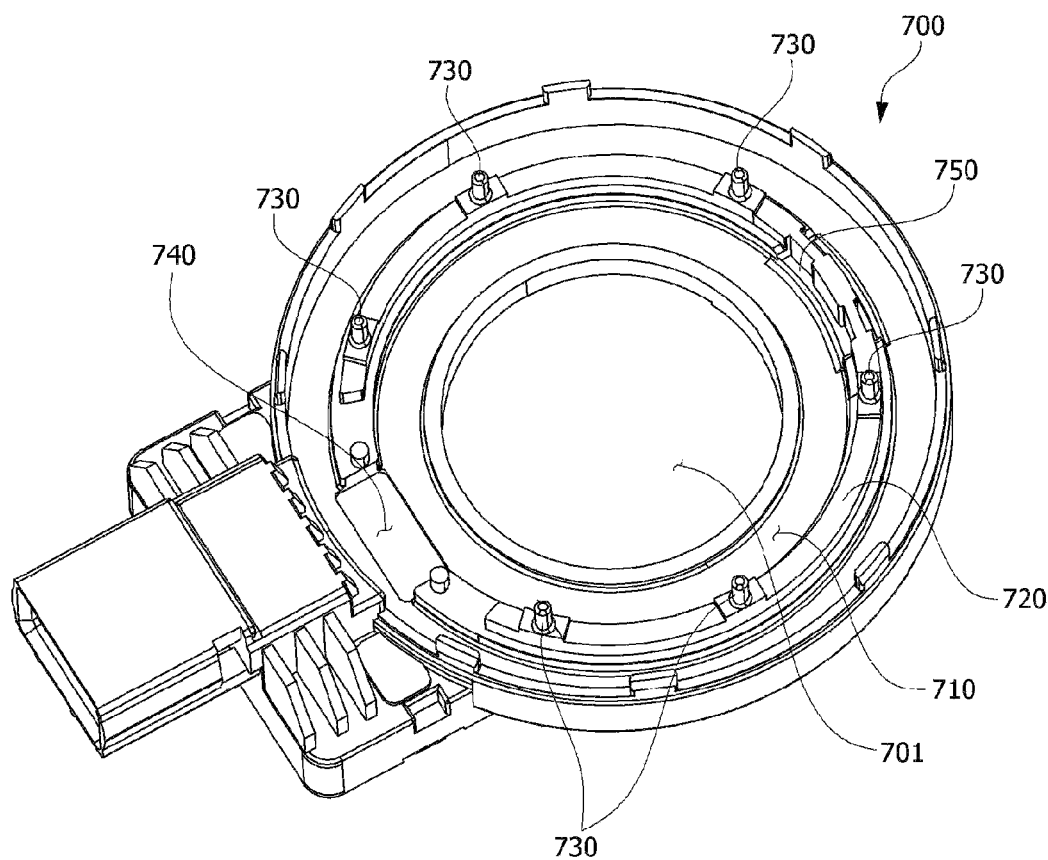

[FIG. 24]
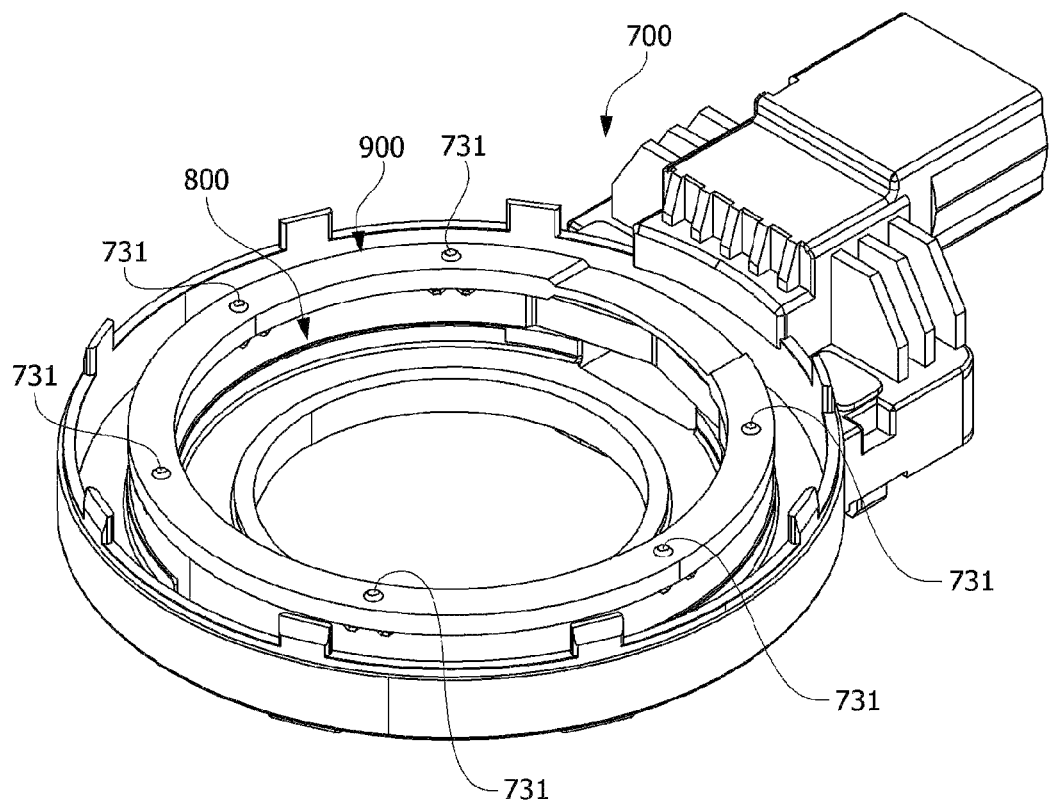

SENSING DEVICE

CROSS-REFERENCE TO RELATED PATENT APPLICATIONS

This application is a U.S. National Stage Application under 35 U.S.C. § 371 of PCT Application No. PCT/KR2020/011384, filed Aug. 26, 2020, which claims priority to Korean Patent Application Nos. 10-2019-0107280, filed Aug. 30, 2019 and 10-2019-0160090, filed Dec. 4, 2019, whose entire disclosures are hereby incorporated by reference.

TECHNICAL FIELD

The present invention relates to a sensing device.

BACKGROUND ART

In an electronic power steering (EPS) system, an electronic control unit drives a sensing apparatus according to driving conditions to secure turning stability and provide a quick reinforcing force so that a driver can travel safely.

An EPS system includes a sensor assembly configured to measure torque, a steering angle, and the like of a steering shaft to provide proper torque. The sensor assembly may include a torque sensor configured to measure the torque applied to the steering shaft and an index sensor configured to measure angular acceleration of the steering shaft. In addition, the steering shaft may include an input shaft connected to a handle, an output shaft connected to a power transmission structure at a side of a wheel, and a torsion bar which connects the input shaft and the output shaft.

The torque sensor measures a degree of torsion of the torsion bar to measure the torque applied to the steering shaft. In addition, the index sensor detects rotation of the output shaft to measure the angular acceleration of the steering shaft. In the sensor assembly, the torque sensor and the index sensor may both be disposed to be integrally formed.

The torque sensor may include a housing, a rotor, a stator, and collectors and may measure the torque. The stator includes stator teeth, which are an integrated magnetic body for operation of a magnetic torque sensor, and a stator body on which the stator teeth are disposed. In addition, the stator teeth may be coupled to the stator body in a welding manner. In addition, the collectors may be fixed to the housing in a welding manner.

However, when an external impact is applied to a welded portion, a phenomenon in which the stator teeth separated from the stator body occurs. In addition, since the plurality of teeth should be fixedly welded, there are problems in that manpower is required and productivity is lowered.

In addition, since the collectors are deformed while a load is applied in an axial direction in a welding process, a problem in which a gap between the collectors varies in a radial direction may occur. In addition, there is a problem in which positions of the collectors change while a protruding structure deteriorates after the welding process is performed. When the gap between the collectors varies, a critical problem in sensor performance may occur.

Technical Problem

The present invention is directed to providing a sensing device of which a fixing force of stator teeth and collectors is increased to prevent separation therebetween and a fixing structure is implemented simply.

Technical Solution

One aspect of the present invention provides a sensing device including a rotor and a stator in which the rotor is disposed, wherein the stator includes stator teeth and a stator body, the stator teeth include first stator teeth and second stator teeth disposed inside the first stator teeth, at least one of the first stator teeth and the second stator teeth includes tips protruding toward a central shaft of the stator, and the tips are disposed on one surface of the stator body.

The first stator teeth may include a plurality of first teeth and a plurality of first tips which are connected to the plurality of first teeth and protrude toward a center of the stator.

The second stator teeth may include a plurality of second teeth and a plurality of second tips which are connected to the plurality of second teeth and protrude toward the center of the stator.

The stator body may include a plurality of first bosses disposed at both sides of each of the first tips and a plurality of second bosses disposed at both sides of each of the second tips.

In the stator body, a plurality of first holes in which the plurality of first tips are disposed and a plurality of second holes in which the plurality of second tips are disposed may be formed.

Another aspect of the present invention provides a sensing device including a housing including a protrusion, a rotor disposed in the housing, a stator including first stator teeth and second stator teeth, a first collector and a second collector which are disposed between the first stator teeth and the second stator teeth, a first sensor disposed between the first collector and the second collector, and a cover disposed on the first collector and the second collector, wherein the cover includes a hole coupled to the protrusion.

An end portion of the protrusion may be in contact with an upper surface of the cover.

The cover may be a ring-shaped member and include a first region having a first thickness and a second region having a second thickness smaller than the first thickness, and the second region may be disposed to correspond to the first sensor in a circumferential direction.

The first collector, the second collector, and the cover may be ring-shaped members, a width of the cover in a radial direction may be greater than a gap between the first collector and the second collector, and the width of the cover may be smaller than a gap between an outermost surface of the first stator teeth and an outermost surface of the second stator teeth.

Still another aspect of the present invention provides a sensing device including a rotor, a stator including stator teeth and a stator body, a collector disposed in the stator body, and a cover disposed on the collector, wherein the stator teeth include first stator teeth and second stator teeth disposed inside the first stator teeth, at least one of the first stator teeth and the second stator teeth includes tips which protrude toward a central shaft of the stator and are disposed on one surface of the stator body, and the cover is disposed between the first stator teeth and the second stator teeth.

Advantageous Effects

Since a sensing device according to an embodiment having the above-descried configuration is implemented so that bent end portions of stator teeth are fixedly seated on a stator holder, assembly of the stator teeth and the stator holder is simple, and manufacturing efficiency can be improved.

In the sensing device according to the embodiment, because the end portions of the stator teeth seated on the stator holder are fixed at both sides, a coupling force between the stator teeth and the stator holder increases, separation of the stator teeth can be prevented even with an external impact, and durability of the sensing device can be secured.

In addition, the performance of a first sensor can be secured by preventing deformation of collectors in a process of fixing the collectors to a housing. Particularly, the performance of the first sensor can be secured by keeping a gap between the collectors from changing.

DESCRIPTION OF DRAWINGS

FIG. 1 is a perspective view illustrating a sensing device according to an embodiment.

FIG. 2 is an exploded perspective view illustrating the sensing device according to the embodiment.

FIG. 3 is a perspective view illustrating a stator.

FIG. 4 is an exploded perspective view illustrating the stator.

FIG. 5 is a perspective view illustrating first stator teeth.

FIG. 6 is a perspective view illustrating second stator teeth.

FIG. 7 is a perspective view illustrating a state in which the first stator teeth and the second stator teeth are disposed.

FIG. 8 is a plan view illustrating the state in which the first stator teeth and the second stator teeth are disposed.

FIG. 9 is a perspective view illustrating a stator holder.

FIG. 10 is a plan view illustrating the stator holder.

FIG. 11 is a plan view illustrating a state in which the first stator teeth and the second stator teeth are coupled to the stator holder.

FIG. 12 is a cross-sectional view illustrating the state in which the first stator teeth and the second stator teeth are coupled to the stator holder.

FIG. 13 is a perspective view illustrating a first collector.

FIG. 14 is a perspective view illustrating a second collector.

FIG. 15 is a plan view illustrating the first collector, the second collector, and a first sensor.

FIG. 16 is a view illustrating stator teeth and a state in which an external magnetic field is avoided.

FIG. 17 is a view illustrating a housing, collectors, and a cover.

FIG. 18 is a perspective view illustrating the cover.

FIG. 19 is a plan view illustrating the cover.

FIG. 20 is a view illustrating an avoidance structure of the first sensor formed on the cover.

FIG. 21 is a side cross-sectional view illustrating the cover in FIG. 18.

FIG. 22 is a view illustrating the first sensor which avoids and is disposed in a second region of the cover.

FIG. 23 is a view illustrating the housing.

FIG. 24 is a perspective view illustrating a state in which the collectors are fixed to the housing by the cover.

MODES OF THE INVENTION

Exemplary embodiments of the present invention will be described in detail with reference to the accompanying drawings.

A direction which is parallel to a longitudinal direction (vertical direction) of a shaft is referred to as an axial direction, a direction which is perpendicular to the axial direction from the shaft is referred to as a radial direction, and a direction following a circumference of a circle having a radius in the radial direction from the shaft is referred to as a circumferential direction.

FIG. 1 is a perspective view illustrating a sensing device according to an embodiment, and FIG. 2 is an exploded perspective view illustrating the sensing device according to the embodiment.

Referring to FIGS. 1 and 2, the sensing device according to the embodiment may include a stator 100, a rotor 200 of which a part is disposed in the stator 100, a first sensor 500, a circuit board 600 electrically connected to the first sensor 500, and a housing 700 to which the circuit board 600 is coupled.

In this case, the stator 100 may be connected to an output shaft (not shown), and the rotor 200 of which at least a part is rotatably disposed in the stator 100 may be connected to an input shaft (not shown), but the present invention is not necessarily limited thereto.

In this case, the rotor 200 may be disposed to be rotatable with respect to the stator 100. Hereinafter, "inside" means a direction toward a center in a radial direction, and "outside" means a direction opposite to "inside."

FIG. 3 is a perspective view illustrating the stator, and FIG. 4 is an exploded perspective view illustrating the stator.

Referring to FIGS. 3 and 4, the stator 100 may include a stator holder 110, a stator body 120, first stator teeth 130, and second stator teeth 140.

The stator holder 110 may be connected to an output shaft of an electric steering apparatus. Accordingly, the stator holder 110 may be rotated in conjunction with rotation of the output shaft. The stator holder 110 may be formed in a cylindrical shape. In addition, the stator holder 110 may be formed of a metal material but is not necessarily limited thereto, and the stator holder 110 may also be formed of another material chosen in consideration of a predetermined strength or more so that allows the output shaft to be fixedly inserted thereinto.

The stator holder 110 may include a groove (not shown). The groove (not shown) is concavely formed in an outer circumferential surface of the stator holder 110. The groove (not shown) is disposed along the outer circumferential surface of the stator holder 110. A separate fixing member may be inserted into the groove (not shown).

The stator holder 110 may be coupled to the stator body 120.

The stator body 120 may be disposed on one end portion of the stator holder 110.

The first stator teeth 130 and the second stator teeth 140 may be fixed to the stator body 120. In this case, the first stator teeth 130 and the second stator teeth 140 may be formed of metal materials to be electrically charged by rotation of a magnet.

FIG. 5 is a perspective view illustrating the first stator teeth.

Referring to FIG. 5, the first stator teeth 130 may include first teeth 131, first tips 132, third teeth 133, and a first band 134.

The first teeth 131 extend from the first band 134. The first teeth 131 are provided as a plurality of first teeth 131. For example, the first teeth 131 may be provided as eight first teeth 131. The plurality of first teeth 131 may be disposed apart from each other in a circumferential direction. In this case, widths of the first teeth 131 may decrease in a direction away from the first band 134.

One end portions of the first teeth 131 may be disposed closer to a center of the stator 100 than the other end portions thereof. In this case, the one end portions of the first teeth 131 may be connected to the first band 134.

The first teeth 131 may include first parts 131A and second parts 131B. The first parts 131A may extend from the first band 134 toward the center of the stator 100. In this case, the first parts 131A may cover partial upper sides of the second stator teeth 140. In addition, the second parts 131B may extend upward from end portions of the first parts 131A. In this case, the second parts 131B may be vertically bent from the first parts 131A. The second parts 131B may be disposed so that a longitudinal direction thereof is the same as an axial direction. Widths of the second parts 131B may decrease in an upward direction.

The first band 134 is formed in a ring shape. The first band 134 may be disposed in the stator body 120. The first band 134 may be connected to one end portions of the plurality of first teeth 131. The first band 134 and the plurality of first teeth 131 may be integrally formed.

A length of the first band 134 in the axial direction may be greater than a thickness thereof in the radial direction. In this case, a length H1 of the first band 134 in the axial direction may be smaller than a length H2 of the first teeth 131 in the axial direction. In addition, the length H1 of the first band 134 in the axial direction may be smaller than a length H3 of the third teeth 133 in the axial direction.

The first tips 132 extend from upper ends of the first teeth 131. The first tips 132 are provided as a plurality of first tips 132. The number of the first tips 132 may be the same as the number of the first teeth 131. In this case, the first tips 132 may extend from the upper ends of the first teeth 131. For example, the first tips 132 may be provided as eight first tips 132. The plurality of first tips 132 may be spaced apart from each other in the circumferential direction. Meanwhile, the number of the first tips 132 may be less than the number of the first teeth 131. In this case, the first tips 132 may be formed on only some of the first teeth 131. In this case, the plurality of first tips 132 may be disposed so that separation distances therebetween are the same.

The first tips 132 may be bent at a predetermined angle with respect to the first teeth 131. In this case, the first tips 132 may be bent inward from the first teeth 131. In addition, the first tips 132 may be bent at 80 to 100 degrees with respect to the first teeth 131. Preferably, the first tips 132 may be bent at 90 degrees with respect to the first teeth 131.

In this case, the first tips 132 may not be bent with respect to the first teeth 131 before the first stator teeth 130 are coupled to the stator body 120. In addition, as illustrated in FIG. 4, the first tips 132 may also be disposed at an angle of 80 degrees or less with respect to the first teeth 131. In addition, the first tips 132 may be bent after being disposed in the stator body 120. In this case, the first tips 132 may be seated on an upper surface of the stator body 120.

Widths X of the first tips 132 may be less than widths Y of the upper ends of the first teeth 131. Accordingly, steps may be formed between the first teeth 131 and the first tips 132. A ratio X/Y of the widths X of the first tips 132 to the widths Y of the upper ends of the first teeth 131 may be in the range of 0.4 to 0.7. Preferably, the ratio X/Y of the widths X of the first tips 132 to the widths Y of the upper ends of the first teeth 131 may be in the range of 0.5 to 0.6. In this case, the widths X of the first tips 132 are widths of one end portions thereof connected to the upper ends of the first teeth 131.

In addition, the widths of the first tips 132 may decrease in a direction away from the first teeth 131. In this case, the first tips 132 may have trapezoidal shapes. In this case, a ratio of long widths of the first tips 132 to short widths thereof may be in the range of 0.8 to 0.9.

Although not illustrated in the drawings, the width of each of the first teeth and the first tips may decrease at a predetermined rate in a direction away from the first band 134. In this case, single trapezoidal members may be bent two times to form the first parts, the second parts, and the first tips.

The third teeth 133 extend from the first band 134. The third teeth 133 are provided as a plurality of third teeth 133. In this case, the number of the third teeth 133 may be the same as the number of the first teeth 131. For example, the third teeth 133 may be provided as eight third teeth 133. The plurality of third teeth 133 may be disposed apart from each other in the circumferential direction. In addition, the third teeth 133 and the first teeth 131 may be alternately disposed in the circumferential direction. In this case, the third teeth 133 may be disposed further outward than the first teeth 131 in the radial direction.

Widths of the third teeth 133 may decrease in a direction away from the first band 134. That is, when seen in the radial direction, widths of lower ends of the third teeth 133 may be greater than widths of upper ends thereof. The third teeth 133 may have trapezoidal shapes.

The lengths H3 of the third teeth 133 in the axial direction may be the same as the lengths H2 of the first teeth 131 in the axial direction. However, the present invention is not limited thereto, and the lengths H2 of the first teeth 131 in the axial direction may be different from the lengths H3 of the third teeth 133 in the axial direction. Long widths of the third teeth 133 may be greater than long widths of the first teeth 131. In addition, short widths of the third teeth 133 may also be greater than short widths of the first teeth 131. In addition, the third teeth 133 may not overlap the first teeth 131 in the radial direction and may also not overlap the first teeth 131 in the circumferential direction.

FIG. 6 is a perspective view illustrating the second stator teeth.

Referring to FIG. 6, the second stator teeth 140 may include second teeth 141, a second band 143, and second tips 142.

The second teeth 141 extend from the second band 143. The second teeth 141 are provided as a plurality of second teeth 141. The second teeth 141 may correspond to the number of the first teeth 131. For example, the second teeth 141 may be provided as eight second teeth 141. The plurality of second teeth 141 may be disposed apart from each other in the circumferential direction. In this case, widths of the second teeth 141 may decrease in a direction away from the second band 143. That is, when seen in the radial direction, widths of lower ends of the second teeth 141 may be greater than widths of upper ends thereof.

A shortest distance between the second teeth 141 and the center of the stator and a shortest distance between the first teeth 131 and the center thereof may be the same. In addition, heights of the upper ends of the second teeth 141 may be the same as heights of the upper ends of the first teeth 131.

In addition, the second teeth 141 may overlap the third teeth 133 in the radial direction.

The second band 143 is formed in a ring shape. The second band 143 is connected to lower ends of the plurality of second teeth 141. In this case, a length H4 of the second band 143 in the axial direction may be less than a length H5 of the second teeth 141 in the axial direction.

A circumference of the second band 143 may be smaller than a circumference of the first band 134. The second band 143 may be disposed inside the first band 134 in the radial direction. The second band 143 and the first band 134 may be spaced apart from each other. The length H4 of the second band 143 in the axial direction may be less than the length H1 of the first band 134 in the axial direction. In this case, the first teeth 131 may be disposed at an upper side of the second band 143.

The second tips 142 extend from the upper ends of the second teeth 141. The second tips 142 are provided as a plurality of second tips 142. The number of the second tips 142 may be the same as the number of the second teeth 141. In this case, the second tips 142 may extend from the upper ends of the second teeth 141. For example, the second tips 142 may be provided as eight second tips 142. The plurality of second tips 142 may be spaced apart from each other in the circumferential direction. Meanwhile, the number of the second tips 142 may be less than the number of the second teeth 141. In this case, the second tips 142 may extend from only some of the second teeth 141. The plurality of second tips 142 are disposed so that separation distances therebetween are the same.

The second tips 142 may be bent at a predetermined angle with respect to the second teeth 141. In this case, the second tips 142 may be bent inward from the second teeth 141. In addition, the second tips 142 may be bent at 80 to 100 degrees with respect to the second teeth 141. Preferably, the second tips 142 may be bent at 90 degrees with respect to the second teeth 141.

The second tips 142 may not be bent with respect to the second teeth 141 before the first stator teeth 130 are coupled to the stator body 120. In addition, as illustrated in FIG. 4, the second tips 142 may also be disposed at 80 degrees or less with respect to the second teeth 141. In addition, the second tips 142 may be bent after being disposed in the stator body 120. In this case, the second tips 142 may be seated on the upper surface of the stator body 120. The first tips 132 and the second tips 142 may be bent at the same time.

In addition, shape of the second tips 142 may be the same as the shapes of the first tips 132.

Meanwhile, the widths of the second teeth 141 and widths of the second tips 142 may decrease at a predetermined rate in a direction away from the second band 143. In this case, single trapezoidal members may be bent inward to form the second teeth and the second tips.

In the sensing device described above, since the bent end portions of the stator teeth are implemented to be fixedly seated on the stator body, assembly of the stator teeth and the stator body is simple, and manufacturing efficiency can be improved.

FIG. 7 is a perspective view illustrating a state in which the first stator teeth and the second stator teeth are disposed, and FIG. 8 is a plan view illustrating the state in which the first stator teeth and the second stator teeth are disposed.

Referring to FIGS. 7 and 8, the first stator teeth 130 and the second stator teeth 140 may be disposed apart from each other in the radial direction. In addition, the first stator teeth 130 may be disposed outside the second stator teeth 140.

The first band 134 and the second band 143 may be disposed apart from each other in the radial direction. In addition, the first teeth 131 may protrude toward the center of the stator 100 and overlap the second teeth 141 in the circumferential direction. In this case, end portions of the plurality of first teeth 131 and end portions of the plurality of second teeth 141 may be disposed on the same circumference line. In this case, the end portions of the plurality of first teeth 131 and the end portions of the plurality of second teeth 141 may be disposed on the upper surface of the stator body 120 at the same separation distances. In this case, the first teeth 131 and the second teeth 141 may be alternately disposed in the circumferential direction. In addition, the end portions of the plurality of first teeth 131 and the end portions of the plurality of second teeth 141 may not protrude further inward than the upper surface of the stator body 120.

The second teeth 141 may overlap the third teeth 133 in the radial direction. In this case, centers of the widths of the second teeth 141 and centers of the widths of the third teeth 133 may be collinear with each other in the radial direction.

FIG. 9 is a perspective view illustrating the stator holder, FIG. 10 is a plan view illustrating the stator holder, FIG. 11 is a plan view illustrating a state in which the first stator teeth and the second stator teeth are coupled to the stator holder, and FIG. 12 is a cross-sectional view illustrating the state in which the first stator teeth and the second stator teeth are coupled to the stator holder.

Referring to FIG. 9, the stator body 120 may include a first region 121, a second region 122, and a third region 123.

The first region 121 may have a cylindrical shape. The first region 121 is disposed outside the stator teeth 210. In this case, the first stator teeth 130 may be fixed in the first region 121. The first stator teeth 130 may be fixed to an inner circumferential surface of the first region 121 by an adhesive member (not shown) such as a glue but is not necessarily limited thereto. For example, the first stator teeth 130 may be fixed in the first region 121 by a coupling member (not shown), in a caulking manner, or the like.

The first region 121 may be formed in a shape in which a lower cylinder and an upper cylinder of which a circumference is smaller than a circumference of the lower cylinder are connected. In this case, a step may be formed on a portion at which the lower cylinder is connected to the upper cylinder in the first region 121. An upper surface of the first band 134 may be in contact with the step in the first region 121. In this case, the first band 134 may overlap the first region 121 in the axial direction.

In addition, the third teeth 133 may be disposed on an inner wall of the first region 121.

The second region 122 may be disposed to be spaced inward from the first region 121. The second region 122 may have a cylindrical shape of which a circumference is smaller than a circumference of the first region 121. In this case, a space is formed between the first region 121 and the second region 122, and the first stator teeth 130 and the second stator teeth 140 may be disposed through the space.

The second stator teeth 140 may be fixed in the second region 122. The second stator teeth 140 may be fixed to an outer circumferential surface of the second region 122 by an adhesive (not shown) such as a glue but is not necessarily limited thereto. For example, the second stator teeth 140 may be fixed in the second region 122 by a coupling member (not shown), in a caulking manner, or the like.

In addition, the first teeth 131 and the second teeth 141 may be disposed on an outer wall of the second region 122.

In addition, the stator holder 110 may be coupled to a lower end of the second region 122. The stator holder 110 may be connected to the output shaft of the electric steering apparatus. Accordingly, the stator holder 110 may rotate in conjunction with rotation of the output shaft. The stator holder 110 may be formed in the cylindrical shape. In addition, the stator holder 110 may be formed of the metal material. In this case, the second region 122 and the stator holder 110 may be coupled in an insert injection manner.

A plurality of first bosses 124 may be formed on an upper surface of the second region 122. In addition, a plurality of second bosses 125 may be formed on the upper surface of the second region 122. In this case, each of the first bosses 124 and the second bosses 125 is formed in a protruding shape protruding upward from the upper surface of the second region 122. The first bosses 124 may be disposed on both end portions of the plurality of first tips 132. In addition, the second bosses 125 may be disposed on both end portions of the plurality of second tips 142. In this case, the first bosses 124 and the second bosses 125 may be alternately disposed in the circumferential direction.

The first bosses 124 and the second bosses 125 may fix both end portions of the first tips 132 and both end portions of the second tips 142 to fix movement of the first stator teeth 130 and the second stator teeth 140 in the circumferential direction. An upper surface of each of the first bosses 124 and the second bosses 125 is positioned at a level higher than an upper surface of each of the first tips 132 and the second tips 142.

The first bosses 124 and the second bosses 125 may be disposed so that longitudinal directions thereof are aligned in the radial direction. In this case, the first bosses 124 and the second bosses 125 may be in contact with parts of side surfaces of the first tips 132 and parts of side surfaces of the second tips 142 and may be spaced apart from the remaining parts of the side surfaces of the first tips 132 or the second tips 142. Meanwhile, the first bosses 124 and the second bosses 125 may be disposed so that the longitudinal directions thereof are inclined with respect to the radial direction. In this case, the first bosses 124 and the second bosses 125 may be disposed at angles corresponding to a ratio between the widths of the first tips 132 and the widths of the second tips 142. Accordingly, the first bosses 124 and the second bosses 125 may be in contact with the side surfaces of the first tips 132 and the side surfaces of the second tips 142.

In addition, the first bosses 124 and the second bosses 125 may be formed in the same shapes. In this case, distances between the plurality of first bosses 124 and distances between the plurality of second bosses 125 may be the same.

In addition, although not illustrated in the drawings, in a sensing device according to another embodiment, a plurality of first grooves (not shown) and a plurality of second grooves (not shown) may be formed in an upper surface of a second region 122. In this case, the first grooves (not shown) may be formed to correspond to the shapes of the first tips 132, and the second grooves (not shown) may be formed to correspond to the shape of the second tips 142. In this case, depths of the first grooves (not shown) and depths of the second grooves (not shown) may be greater than thicknesses of the first tips 132 and thicknesses of the second tips 142.

The first tips 132 may be disposed in the first grooves (not shown), and the second tips 142 may be disposed in the second grooves (not shown). In this case, the first grooves (not shown) and the second grooves (not shown) may fix both side portions of the first tips 132 and both side portions of the second tips 142 to fix movement thereof in a circumferential direction like the first bosses 124 and the second bosses 125.

In addition, although not illustrated in the drawings, in a sensing device according to still another embodiment, the first tips 132 and the second tips 142 are disposed on the upper surface of a second region 122, and the sensing device may further include a coupling member (not shown) for fixing the first tips 132 and the second tips 142 to the upper surface of the second region 122.

The third region 123 may be disposed between the first region 121 and the second region 122. In this case, the third region 123 may connect the first region 121 and the second region 122. A height of the third region 123 may be lower than a height of the first region 121 or a height of the second region 122 in an axial direction.

The third region 123 divides a space between the first region 121 and the second region 122 into an upper space S1 and a lower space S2. In this case, the first teeth 131, the second teeth 141, and the third teeth 133 may be disposed in the upper space S1, and the first band 134 and the second band 143 may be disposed in the lower space.

Referring to FIG. 10, in the third region 123, a plurality of first holes 1231 and a plurality of second holes 1232 may be formed. In this case, the first holes 1231 and the second holes 1232 are provided for the first stator teeth 130 and the second stator teeth 140 to be disposed therein.

The plurality of first holes 1231 may be disposed in an outer side portion of the third region 123. The plurality of first holes 1231 may be spaced apart from each other in the circumferential direction. In this case, widths of the first holes 1231 in the radial direction are greater than widths thereof in the circumferential direction.

The widths of the first holes 1231 in the circumferential direction are greater than the long widths of the third teeth 133. The third teeth 133 are disposed in the first holes 1231. In this case, the third teeth 133 pass through the first holes 1231 and are disposed in the upper space S1. The number of the first holes 1231 is the same as the number of third teeth 133. The first holes 1231 may be disposed adjacent to the inner circumferential surface of the first region 121. The first holes 1231 may be formed in the third region 123 and may be in contact with the inner circumferential surface of the first region 121.

Meanwhile, the plurality of second holes 1232 may be formed in an inner side portion of the third region 123. The plurality of second holes 1232 may be spaced apart from each other in the circumferential direction. In this case, widths of the second holes 1232 in the radial direction are greater than widths thereof in the circumferential direction.

The widths of the second holes 1232 in the circumferential direction are greater than the long widths of the first teeth 131 or the second teeth 141. The first teeth 131 or the second teeth 141 are disposed in the second holes 1232. In this case, the first teeth 131 or the second teeth 141 pass through the second holes 1232 and are disposed in the upper space S1. The number of the second holes 1232 is the sum of the number of the first teeth 131 and the number of the second teeth 141. The second holes 1232 may be disposed adjacent to the outer circumferential surface of the second region 122. The second holes 1232 may be formed in the third region 123 and may be in contact with the outer circumferential surface of the second region 122.

In the sensing device described above, since the bent end portions of the stator teeth seated on the stator holder are fixed, a coupling force between the stator teeth and the stator holder increases, separation of the stator teeth can be prevented even with an external impact, and durability of the sensing device can be secured.

FIG. 13 is a perspective view illustrating a first collector, FIG. 14 is a perspective view illustrating a second collector, and FIG. 15 is a plan view illustrating the first collector, the second collector, and the first sensor 500.

Referring to FIGS. 13 to 15, collectors 800 may include a first collector 810 and a second collector 820. Each of the first collector 810 and the second collector 820 collects a flux of the stator 100. In addition, each of the first collector 810 and the second collector 820 may be formed of a metal material. The first collector 810 and the second collector 820 have a distance d1 therebetween in the radial direction, wherein the distance is the same as a distance D1 of FIG. 15.

The second collector 820 may be disposed inside the first collector 810 in the radial direction around a center C of the stator. Each of the first collector 810 and the second collector 820 may be a ring type member. Since each of the first collector 810 and the second collector 820 is a ring type member, the collector 800 may cover an entire region of the first and second stator teeth 130 and 140 in the circumferential direction. As a result, when the entire region of the first and second stator teeth 130 and 140 is considered, since sensitivity of a measured magnetic flux according to a deviation of a gap between the first and second stator teeth 130 and 140 and the first sensor 500 is stabilized complementarily, there is an advantage of improving a wobble value.

The first collector 810 and the second collector 820 may include extension parts 811 and 821, first bodies 812 and 822, and second bodies 813 and 823. The first bodies 812 and 822 and the second bodies 813 and 823 are disposed to face the first sensor 500. The second bodies 813 and 823 may extend from the first bodies 812 and 822. The extension parts 811 and 821 may extend from the first bodies 812 and 822 and from the second bodies 813 and 823. The first bodies 812 and 822 and the second bodies 813 and 823 may include flat surfaces having flat shapes. The extension parts 811 and 821 may have curved surfaces. The extension parts 811 and 821 may include protruding parts 814 and 824. The protruding parts 814 and 824 are disposed to extend downward from lower ends of the extension parts 811 and 821. The protruding parts 814 and 824 are provided to couple the housing 700 and the collectors 800.

The first sensor 500 detects a change in magnetic field generated between the stator 100 and the rotor 200. The first sensor 500 may be a Hall integrated circuit (IC). The sensor 500 detects a magnetization amount of the stator 100 generated due to an electrical interaction between a magnet 230 of the rotor 200 and the stator 100. The sensing device measures torque on the basis of the detected magnetization amount.

FIG. 16 is a view illustrating the stator teeth 130 and 140 and a state in which an external magnetic field is avoided.

Referring to FIG. 16, along with the first stator teeth 130, the first collectors 810 serve as a shield against an external electric field heading toward the first sensor 500.

The external magnetic field greatly affects the sensing device in a y'-axis direction. In this case, the y'-axis direction is a direction toward the first sensor 500 in the radial direction perpendicular to the axial direction. Since the external magnetic field in the y'-axis direction is induced along the first stator teeth 130 and the second stator teeth 140 as in S1 of FIG. 16, the external magnetic field flows without affecting the first sensor 500. Accordingly, the sensing device according to the embodiment has an advantage in that the influence of the external magnetic field on the first sensor 500 is small even in the y'-axis direction.

In addition, since the external magnetic field passing through the first stator teeth 130 to head toward the first sensor 500 may be induced as in S2 of FIG. 16 by the first collector 810, the external magnetic field flows without affecting the first sensor 500 disposed inside the first collector 810. Accordingly, the sensing device according to the embodiment has an advantage in that the influence of the external magnetic field on the first sensor 500 is small even in the y'-axis direction.

FIG. 17 is a view illustrating the housing 700, the collectors 800, and a cover 900.

Referring to FIG. 17, the collectors 800 are installed in the housing 700. The cover 900 is disposed on an upper side of the collectors 800 to fix the collectors 800 to the housing 700.

FIG. 18 is a perspective view illustrating the cover 900, FIG. 19 is a plan view illustrating the cover 900, FIG. 20 is a view illustrating an avoidance structure of the first sensor 500 formed on the cover 900, and FIG. 21 is a side cross-sectional view illustrating the cover 900 in FIG. 18.

When the distance d1 between the first collector 810 and the second collector 820 in the radial direction changes, since sensitivity of a measured magnetic flux is changed, the performance of the first sensor 500 becomes critical.

Referring to FIGS. 18 to 21, the cover 900 is a member for securing a constant distance between the first collector 810 and the second collector 820 in the radial direction by preventing deformation of the collectors 800 in a process in which the collectors 800 are fixed to the housing 700.

The cover 900 may be a ring type member corresponding to shapes of the collectors 800. In addition, the cover 900 may include a first surface 911 and a second surface 912. The first surface 911 may be an upper surface, and the second surface 912 may be a lower surface. The second surface 912 may be in contact with an upper end of the first collector 810 and an upper end of the second collector 820. That is, the upper end of the first collector 810 and the upper end of the second collector 820 may be in contact with the same surface which is the second surface 912. In addition, the cover 900 may include a plurality of holes 901. The holes 901 are disposed to pass through the first surface 911 and the second surface 912. The holes 901 are to be coupled to the housing 700.

In the radial direction, a width P of the cover 900 may be greater than the distance D1 between the first collector 810 and the second collector 820 in the radial direction and may be smaller than the distance between the first stator teeth 130 and the second stator teeth 140 in the radial direction.

The cover 900 may be divided into a first region 910 and a second region 920. The first region 910 may have a first thickness T1, and the second region 920 may have a second thickness T2 which is smaller than the first thickness T1. The first region 910 may be a region in contact with the first collector 810 and the second collector 820, and the second region 920 may be a region which is not in contact with the first collector 810 and the second collector 820.

The second region 920 is to secure an avoidance space of the first sensor 500 in the axial direction.

On the basis of the circumferential direction, the cover 900 is fixed to the housing 700 so that the second region 920 corresponds to a position of the first sensor 500. In addition, in the circumferential direction, the cover 900 is disposed so that the second region 920 corresponds to the first body 812 and the second body 813 of the collector 800.

The second region 920 may include a third surface 921 connected to the first surface 911 and a fourth surface 922 connected to the second surface 912. In the cover 900, a height difference H1 between the first surface 911 and the third surface 921 connected thereto may be the same as a height difference H2 between the second surface 912 and the fourth surface 922. This is to use the cover 900 without distinguishing an upper side and a lower side thereof.

Referring to FIG. 21, the second surface 912 of the first region 910 is in contact with the upper end of the first collector 810 and the upper end of the second collector 820. The second region 920 may be disposed apart from the upper end of the first collector 810 and the upper end of the second collector 820.

FIG. 22 is a view illustrating the first sensor 500 which avoids and is disposed in the second region 920 of the cover 900.

Referring to FIG. 22, an upper end portion of the first sensor 500 may be positioned in the avoidance space due to the second region 920. Accordingly, a part of the upper end portion of the first sensor 500 is disposed to form an overlap region O overlapping the first region 910 in the circumferential direction.

FIG. 23 is a view illustrating the housing 700, and FIG. 24 is a perspective view illustrating a state in which the collector 800 is fixed to the housing 700 by the cover 900.

Referring to FIGS. 23 and 24, the housing 700 may include a housing body 710, a first protrusion 720, and second protrusions 730. The housing body 710 may have a plate shape which includes an upper surface and a lower surface and of which an upper portion and a lower portion are open. A hole 701 is disposed at a center of the housing body 710. The stator holder 110 is positioned inside the hole 701. The circuit board 600 may be mounted on the lower surface of the housing body 710. The first sensor 500 is mounted on the circuit board 600. The first sensor 500 may pass through the hole 701 of the housing 700 and may be disposed on the upper surface of the housing 700. A separate cover is coupled to a lower side of the housing body 710 to cover the circuit board 600. In addition, grooves 750 into which the protruding parts 814 and 824 of the collectors 800 are inserted may be disposed in the housing 700.

The first protrusion 720 may protrude from the upper surface of the housing 700 in the axial direction. The first protrusion 720 may be disposed along a circumference of the hole 701. The first protrusion 720 may be an arc-shaped member. The first protrusion 720 may be disposed between the first collector 810 and the second collector 820 in the radial direction. An outer circumferential surface of the first protrusion 720 may be in contact with an inner circumferential surface of the first collector 810, and an inner circumferential surface of the first protrusion 720 may be in contact with an outer circumferential surface of the second collector 820.

The second protrusions 730 may be disposed to protrude from an upper surface of the first protrusion 720 in the axial direction. In addition, the second protrusions 730 may be disposed between the first collector 810 and the second collector 820 in the radial direction. In addition, the second protrusions 730 may be provided as a plurality of second protrusions 730. The second protrusions 730 may be pin members with circular cross-sectional shapes. The second protrusions 730 are for fixing the cover 900 to the housing 700. The second protrusions 730 may be disposed to pass through the holes 901 of the cover 900. Heads 731 of the second protrusions 730 are exposed upward from the first surface 911 of the cover 900. When the heads 731 of the second protrusions 730 is welded, the heads 731 are in contact with the first surface 911 of the cover 900 to fix the cover 900 to the housing 700 in a state in which the heads 731 cover the holes 901.

In this case, when the cover 900 is fixed to the housing 700, since the second surface 912 of the cover 900 uniformly presses the upper end of the first collector 810 and the upper end of the second collector 820 in the axial direction at the same time, in a state in which the distance between the first collector 810 and the second collector 820 in the radial direction distance is constantly maintained, the first collector 810 and the second collector 820 may be fixed to the housing 700. In addition, since the second protrusions 730, the first collector 810, and the second collector 820 on which welding is performed are not in direct contact with each other, a position of the first collector 810 and a position of the second collector 820 may be prevented from changing in the radial direction while welded portions deteriorate after the welding is performed.

The embodiments described above can be used in various apparatus for vehicles, home appliances, or the like.

The invention claimed is:

1. A sensing device, comprising:
a rotor; and
a stator in which the rotor is disposed, wherein the stator includes stator teeth and a stator body, the stator teeth include first stator teeth and second stator teeth disposed inside of the first stator teeth, wherein at least one of the first stator teeth or the second stator teeth includes tips protruding toward a center of the stator, and wherein:
the first stator teeth include a first band, and a plurality of first teeth and third teeth extending from the first band;
the second stator teeth include a plurality of second teeth, and a plurality of second tips which are connected to the plurality of second teeth and protrude toward the center of the stator;
the stator body includes a first region and a second region disposed to be spaced apart from each other in a radial direction;
the first teeth and the third teeth are alternately disposed in a circumferential direction;
the third teeth are disposed outside of the first teeth in the radial direction;
the first region is disposed outside of the third teeth in the radial direction;
the second tips are disposed on one surface of the stator body; and
the first band and the second band overlap in the radial direction.

2. The sensing device of claim 1, wherein the first stator teeth include:
a plurality of first tips which are connected to the plurality of first teeth and protrude toward the center of the stator.

3. The sensing device of claim 2, wherein the stator body includes:
a plurality of first bosses disposed at both sides of each of the first tips; and
a plurality of second bosses disposed at both sides of each of the second tips.

4. The sensing device of claim 2, wherein the stator body includes:
a plurality of first grooves in which the plurality of first tips are disposed, and a plurality of second grooves in which the plurality of second tips are disposed.

5. The sensing device of claim 1, wherein:
a first number of the first tips are disposed on an end portion of the first teeth.

6. The sensing device of claim 5, wherein:
the second stator teeth include the second band which is disposed inside of the first band in the radial direction and the plurality of second teeth extending from the second band; and a second number of the second tips are disposed on an end portion of the second teeth.

7. The sensing device of claim 6, wherein the second teeth are disposed to overlap the third teeth in the radial direction.

8. The sensing device of claim 7, wherein:
the first teeth include first parts extending from the first band toward the center of the stator and second parts extending upward from an end portion of the first part; and
the first parts are disposed to overlap the second band in an axial direction.

9. The sensing device of claim 7, wherein the stator body includes:
the first region;
the second region disposed to be spaced inward from the first region; and
a third region connecting the first region and the second region, wherein the first stator teeth and the second stator teeth are disposed in a space formed between the first region and the second region, and the first number of the first tips formed on the first teeth and the second number of the second tips formed on the second teeth are disposed on an upper surface of the second region.

10. The sensing device of claim 9, wherein the third region divides the space into an upper space and a lower space.

11. The sensing device of claim 10, wherein:
the stator body incudes a plurality of first holes and second holes formed in the third region;
the third teeth pass through the first holes and are disposed in the upper space; and
the first teeth and the second teeth pass through the second holes and are disposed in the upper space.

12. The sensing device of claim 11, comprising:
a first collector and a second collector which are disposed between the first band and the second band;
a sensor disposed between the first collector and the second collector;
a cover disposed on the first collector and the second collector; and
a housing in which the first collector and the second collector are disposed, wherein the housing includes a housing body and a first protrusion formed to protrude from the housing body, the first collector is in contact with an outer side of the first protrusion, and the second collector is in contact with an inner side of the first protrusion.

13. The sensing device of claim 12, wherein:
the housing body includes a hole through which the sensor passes and in which the sensor is disposed; and
the hole is disposed between one end portion of the first protrusion formed in an arc shape and the other end portion thereof.

14. The sensing device of claim 13, wherein:
the cover includes a first region having a first thickness and a second region having a second thickness which is smaller than the first thickness;
the second region of the cover is disposed to overlap the sensor in an axial direction; and
an upper end of the sensor is disposed to overlap the first region of the cover in the circumferential direction.

15. The sensing device of claim 1, further comprising a first collector and a second collector which are disposed between the first stator teeth and the second stator teeth.

* * * * *